US011247771B2

United States Patent
Bottasso et al.

(10) Patent No.: US 11,247,771 B2
(45) Date of Patent: Feb. 15, 2022

(54) HELICOPTER KIT

(71) Applicant: LEONARDO S.P.A., Rome (IT)

(72) Inventors: Luigi Bottasso, Samarate (IT); Attilio Colombo, Samarate (IT); Pierangelo Masarati, Samarate (IT); Aykut Tamer, Samarate (IT); Giuseppe Quaranta, Samarate (IT)

(73) Assignee: LEONARDO S.P.A., Rome (IT)

( * ) Notice: Subject to any disclaimer, the term of this patent is extended or adjusted under 35 U.S.C. 154(b) by 150 days.

(21) Appl. No.: 16/763,802

(22) PCT Filed: Jun. 28, 2019

(86) PCT No.: PCT/IB2019/055518
§ 371 (c)(1),
(2) Date: May 13, 2020

(87) PCT Pub. No.: WO2020/021359
PCT Pub. Date: Jan. 30, 2020

(65) Prior Publication Data
US 2020/0385105 A1    Dec. 10, 2020

(30) Foreign Application Priority Data
Jul. 27, 2018   (EP) .................................... 18186074

(51) Int. Cl.
*B64C 27/00* (2006.01)
*F16F 7/10* (2006.01)

(52) U.S. Cl.
CPC .......... *B64C 27/001* (2013.01); *F16F 7/1022* (2013.01); *B64C 2027/002* (2013.01);
(Continued)

(58) Field of Classification Search
CPC ............ B64C 27/001; B64C 2027/002; B64C 2027/005; F16F 7/1022
See application file for complete search history.

(56) References Cited

U.S. PATENT DOCUMENTS 4,094,387 A * 6/1978 Pelat ....................... F16L 3/202
                                                      188/381
4,187,933 A   2/1980 Calabrese et al.
(Continued)

FOREIGN PATENT DOCUMENTS

| DE | 100 01 159 | 7/2001 |
| EP | 1402327 | 3/2004 |
| JP | S6078130 | 5/1985 |

*Primary Examiner* — Philip J Bonzell
*Assistant Examiner* — Tye William Abell
(74) *Attorney, Agent, or Firm* — Leason Ellis LLP (57) ABSTRACT

A kit is described that comprises a device adapted to dampen the vibrations transmitted by the rotor to the fuselage; the device comprises two first elements movable along a first axis; two second elements rotatable about the first axis; a first inerter with a first female screw, a first screw, and first rollers rotatable about respective second axes and around the first axis with respect to the first female screw and first screw; a second inerter with a second female screw, a second screw operatively connected to the second female screw; and a plurality of second rollers rotatable about second axes and around the first axis with respect to the second female screw and second screw; the first and second female screws defining the first threaded elements, and the first and second screws defining the second threaded elements; or the first and second screws defining the first threaded elements and the first and second female screws defining the second threaded elements.

15 Claims, 5 Drawing Sheets

(52) U.S. Cl.
CPC ..... *B64C 2027/005* (2013.01); *F16F 2222/08* (2013.01); *F16F 2232/06* (2013.01)

(56) References Cited

U.S. PATENT DOCUMENTS

| | | | | |
|---|---|---|---|---|
| 5,293,974 | A | * 3/1994 | Bietenhader | B64C 27/001 188/379 |
| 5,568,847 | A | 10/1996 | Guilloud et al. | |
| 6,145,785 | A | * 11/2000 | Certain | B64C 27/001 244/17.27 |
| 6,283,408 | B1 | * 9/2001 | Ferullo | B64C 27/001 244/17.27 |
| 2008/0093499 | A1 | * 4/2008 | Bietenhader | B64C 27/001 244/17.11 |
| 2009/0108510 | A1 | 4/2009 | Wang et al. | |

* cited by examiner

HELICOPTER KIT

CROSS-REFERENCE TO RELATED APPLICATIONS

This patent application is a U.S. National Phase Application under 35 U.S.C. § 371 of International Patent Application No. PCT/IB2019/055518, filed on Jun. 28, 2019, which claims priority from European Patent Application No. 18186074.3 filed on Jul. 27, 2018, all of which are incorporated by reference, as if expressly set forth in their respective entireties herein.

TECHNICAL FIELD

The present invention relates to a kit for a helicopter.

BACKGROUND ART

Helicopters are known to basically comprise a fuselage, a main rotor positioned on the top of the fuselage and rotating about its own axis, and a tail rotor located at an end of the fuselage.

In greater detail, the rotor, in turn, basically comprises:
a support casing;
a hub rotatable about the aforesaid axis and equipped with a plurality of blades radially fastened to and projecting from the aforesaid hub; and
a mast that can be connected to a drive member and operatively connected to the hub to drive it in rotation.

The fuselage is normally constrained to the rotor by a plurality of connecting rods and an anti-torque plate; in other words, the fuselage is "suspended" from the support casing.

In use, operation of the rotor causes the creation of high and low frequency vibrations. More specifically, low-frequency vibrations are generated by the wash separating from the blades and from the centre of the hub. This separation takes place at the centre of the hub and affects the vertical and horizontal aerodynamic tail surfaces and the tail rotor.

The rotation of the blades at high angular speeds causes, in use, the generation of further high-frequency vibrations, which are transmitted to the mast, and therefore to the fuselage, deteriorating comfort for the occupants of the fuselage.

Within the industry, it is known that the vibratory loads acting on the rotor have pulses equal to $N*\Omega$ and multiples thereof in the reference system integral with the fuselage, where $\Omega$ is the rotation speed of the mast and N represents the number of blades of the rotor.

In other words, the hub and the mast transfer the vibratory aerodynamic load pulses acting in the plane of the blades onto the aforesaid pulses.

From the foregoing, there is a clearly felt need within the industry for limiting transmission from the mast to the fuselage of vibrations with the aforementioned pulse values equal to $N*\Omega$ and multiples thereof.

To this end, there are known passive and active damping devices.

Passive damping devices basically comprise masses elastically suspended from the mast or the hub by springs. The vibration of these suspended masses enables at least partially absorb the vibrations on the mast and the hub.

The aforementioned damping devices convert the vibratory energy into kinetic energy of the aforementioned masses in their elastically supported movement and exert a damping force proportional to the spring modulus and the displacement of the masses.

Alternatively, active damping devices are basically actuators that exert a sinusoidal damping force on the hub or on the mast, which counters the force generated by the vibrations.

Passive damping devices require the use of combinations of masses and springs in standard layouts and have minimum overall dimensions that limit flexibility of use.

Active damping devices are expensive and complex to manufacture.

A further, recently developed solution is represented by so-called "inertance" devices.

These devices, known as "inerters", are interposed between a first point, of the vibration source, and a second point, of a structure it is wished to insulate from the vibrations, and exert a force on them proportional to the difference in acceleration between the first and the second points, measured along the line joining the first and second points.

Through an appropriate calibration of the inertia of the inerter's translating and rotating masses, it is possible to ensure that this force reduces or cancels the transmission of vibrations with a given frequency from the source of vibrations to the structure to be insulated.

One of the first examples of these inerter-type devices is illustrated in EP-B-1402327 and basically comprises:
a rod connected to the first point;
a casing connected to the second point and with respect to which the rod can slide; and
a flywheel connected to the rod and rotatable inside the casing as a result of the rod sliding due to vibrations on the first point.

US-A-2009/0108510 describes a further inerter-type damping device.

The typical implementation of an inerter device provides for the conversion of an oscillatory linear movement into an alternating rotary movement of a flywheel with a moment of inertia.

The use of inerter-type damping devices may thus cause the generation of torque due to the angular accelerations to which the flywheel with rotational inertia is subjected; in turn, the aforementioned torque can cause undesired vibrations. In particular, in the case of an inerter applied to insulate vibrations along a rod and having a flywheel with its axis coincident with the rod's axis, this torque is torsionally directed to an extension axis of the rod.

There is awareness of the need to have an inerter-type damping device that is easily integrable in helicopters of known type without altering the aerodynamic configuration of the helicopter.

There is also awareness in the industry of the need to have an inerter-type damping device that reduces the transmission of the aforementioned torque to the fuselage as far as possible, so as to increase the comfort for the helicopter's passengers, especially with regard to helicopters intended for the VIP segment.

There is also awareness in the industry of the need to reduce the risk of damage to an inerter-type damping device that might derive from the presence of the aforementioned inertia torque.

Finally, there is also awareness in the industry of the need to increase the operating life of an inerter-type damping device as far as possible.

DISCLOSURE OF INVENTION

The object of the present invention is to provide a kit for a helicopter that enables satisfying at least one of the aforementioned needs in a simple and inexpensive manner.

The aforementioned object is achieved by the present invention, in so far as it relates to a kit for a helicopter according to claim 1.

BRIEF DESCRIPTION OF THE DRAWINGS

For a better understanding of the present invention, two preferred embodiments are described hereinafter, purely by way of non-limitative example and with reference to the accompanying drawings, in which.

Figure 1:
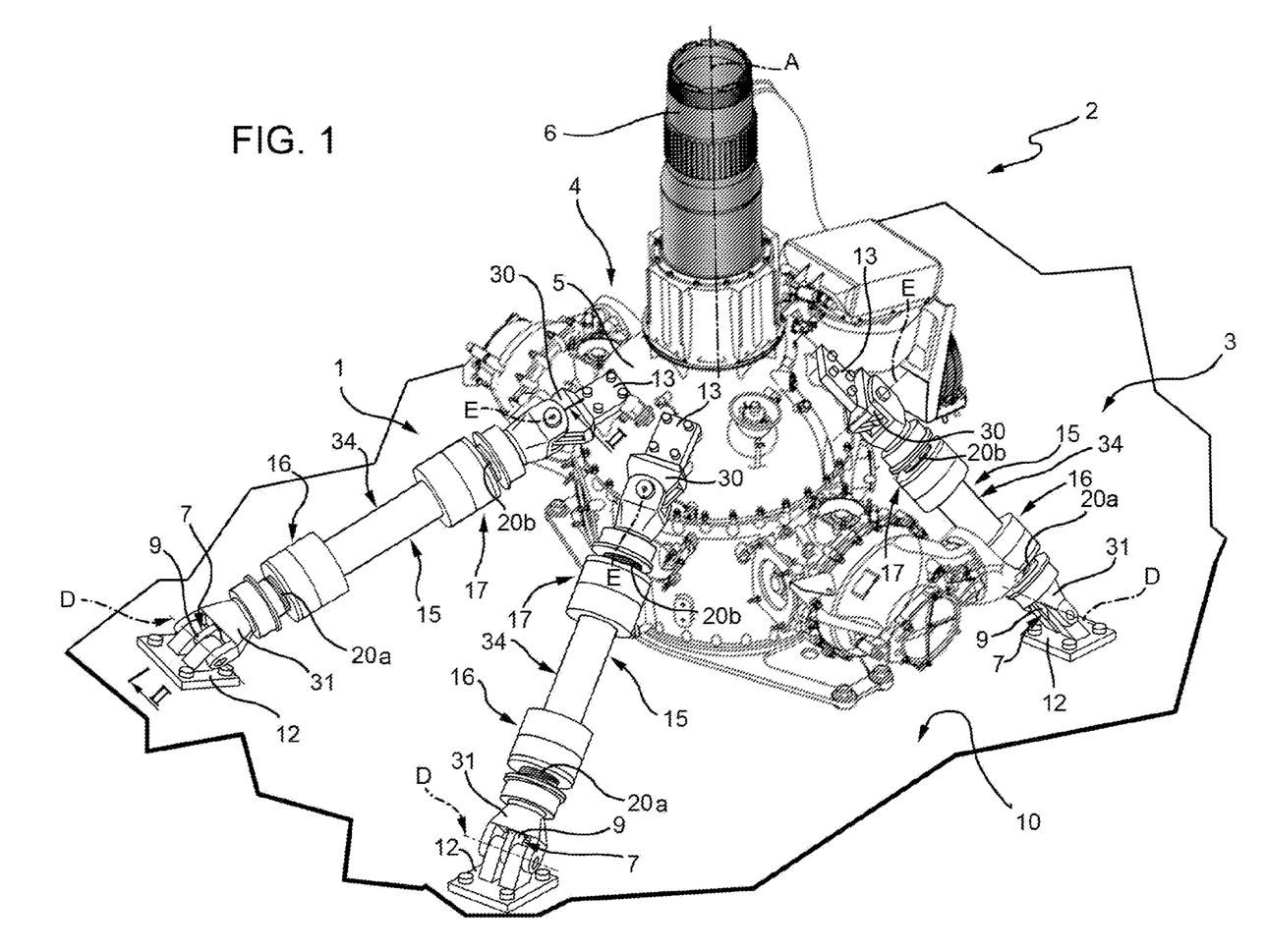
FIG. 1 is a perspective side view of a transmission casing for a main rotor of a helicopter with a kit according to a first embodiment of the present invention, with parts removed for the sake of clarity.

Referring to FIG. 1, reference numeral 1 indicates a kit for a helicopter 2.

BEST MODE FOR CARRYING OUT THE INVENTION

Figure 7:
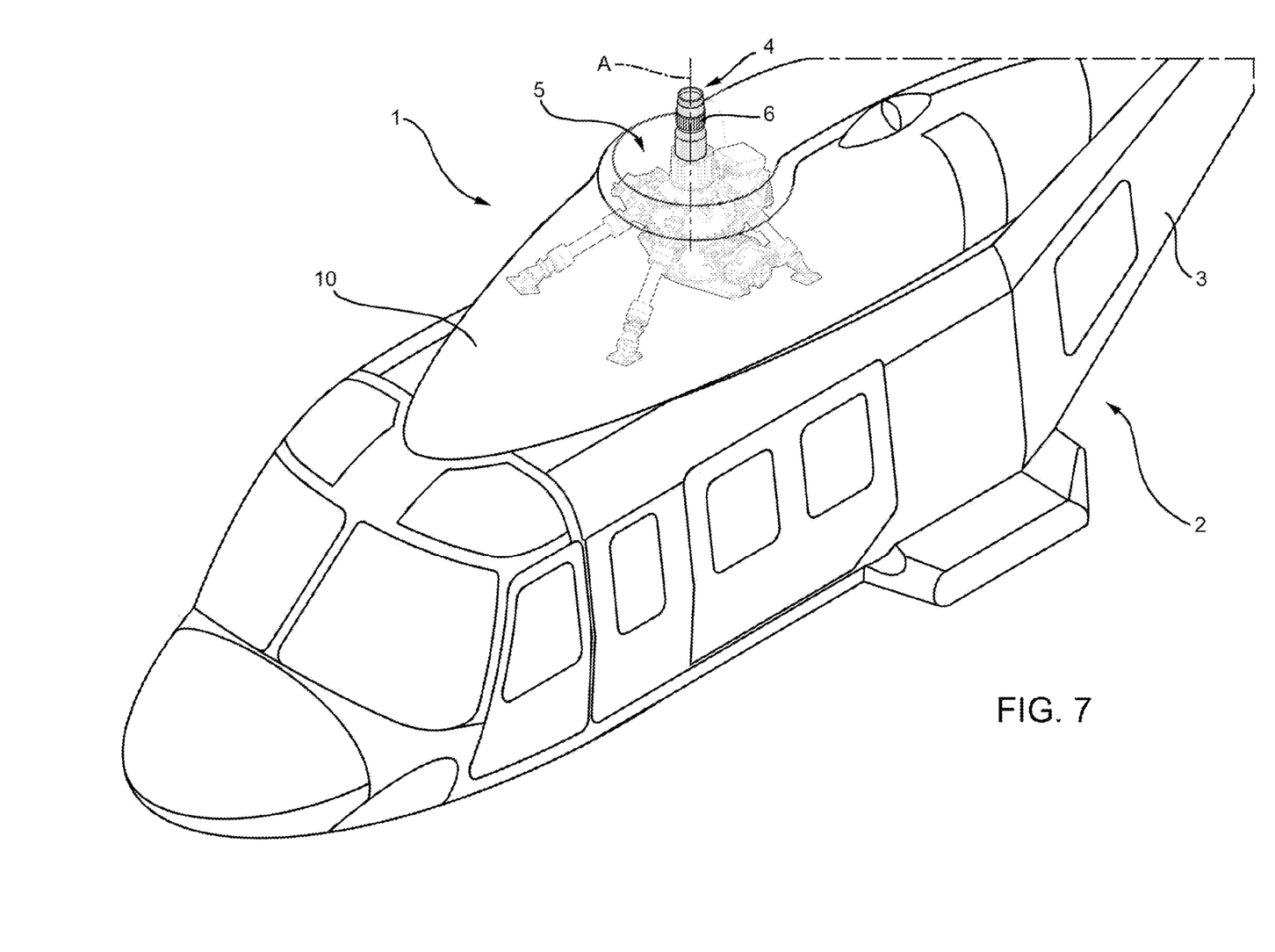
FIG. 7 is a perspective view, on a highly enlarged scale, of a helicopter incorporating the kit of FIGS. 1 to 6.

Referring to FIG. 7, the helicopter 2 basically comprises a fuselage 3, a main rotor 4 (only partially shown) positioned on the top of the fuselage 3 and rotating about an axis A, and a tail rotor located at one end of the fuselage 3 and rotating about its own axis, transversal to axis A.

In greater detail, the rotor 4 is only shown with regards to:
- a support casing 5; and
- a mast 6 rotatable about axis A, in a manner not shown, with a drive unit, for example a turbine, carried by the helicopter 1 and operatively connected to a hub (not shown) on which a plurality of blades (also not shown) are hinged.

The helicopter 2 also comprises a plurality of rods 7, which extend along respective axes B that are oblique to axis A and have respective mutually opposite ends 8 and 9 respectively fastened to the casing 5 and to a top portion 10 of the fuselage 3.

The rods 7 are hinged to respective anchors 12 and 13 carried by the top portion 10 and by the casing 5, respectively, about respective axes D and E.

The kit 1 comprises a plurality of devices 15 for damping vibrations transmitted to the fuselage 3 by the rotor 4.

In the case shown, there are four devices 15 associated with respective rods 7.

Referring to FIGS. 2 to 5, the devices 15 extend along respective axes B, are hollow and house the associated rods 7.

As the devices 15 are conceptually identical, only a single device 15 is described below.

In greater detail, the device 15 comprises (FIGS. 2 to 5):
- a tubular axial end lug 30 fastened to the casing 5; and
- a tubular axial end lug 31, axially opposite to lug 30 and fastened to the top portion 10 of the fuselage 2.

The lugs 30 and 31 are hinged to respective anchors 12 and 13 about respective axes E and D.

Consequently, lug 30 is subjected to a movement of axial vibration parallel to axis B, which is caused by the vibratory loads transmitted by the casing 5.

Advantageously, the device 15 comprises (FIGS. 2 to 5):
- a pair of female screws 21a and 21b movable parallel to axis B as a result of the vibrations transmitted from the casing 5;
- a pair of screws 20a and 20b rotatable about axis B and operatively connected to the respective female screws 21a and 21b so as to rotationally vibrate about axis B;
- an inerter 16; and
- an inerter 17;

the inerter 16, in turn, comprises:
- the screw 20a;
- the female screw 21a; and
- a plurality of threaded rollers 22a, which have a thread 23 screwed on the associated screw 20a and on the associated female screw 21a, are rotatable about respective axes C parallel to and separate from axis B with respect to screw 20a and female screw 21a, and are rotatable with a revolutionary movement around axis B with respect to screw 20a and female screw 21a;

inerter 17, in turn, comprises:
- screw 20b;
- female screw 21b; and
- a plurality of threaded rollers 22b, which have a thread 23 screwed on the associated screw 20b and on the associated female screw 21b, are rotatable about respective axes C parallel to and separate from axis B with respect to the screw 20b and female screw 21b, and are rotatable with a revolutionary movement around axis B with respect to the screw 20b and female screw 21b.

Proceeding along axis B from lug 30 to lug 31, the inerter 16 is interposed between the lug 30 and the inerter 17, while the inerter 17 is interposed between the inerter 16 and the lug 31.

In other words, the inerters 16 and 17 are arranged "in series" along axis B.

Inerter 16 exerts a force on lug 30 and inerter 17 proportional to the difference in acceleration between lug 30 and inerter 17.

Inerter 17 exerts a force on inerter 16 and lug 31 proportional to the difference in acceleration between inerter 16 and lug 31.

In this "in series" configuration, each inerter is subjected to half of the relative displacement between lug 30 and lug 31, while the load that passes through them is the same.

In consequence, the device 15 exerts a force on lugs 30 and 31, and therefore on the casing 5 of the rotor 4 and the fuselage 2, that is proportional to the difference in acceleration along axis B between lugs 30 and 31, and therefore between the casing 5 of the rotor 4 and the top portion 10 of the fuselage 3.

The aforesaid force enables curbing the transmission of vibrations from the casing 5 to the top portion 10 of the fuselage 2.

In particular, each inerter 16 and 17 has an inertance equal to double the total inertance of the device 15.

This is because each inerter 16 and 17 is subjected to a displacement, and therefore to an acceleration corresponding to half the displacement, and therefore to the acceleration between lugs 30 and 31. In this description, by inertance we mean the ratio between force generated by the device and the relative acceleration between its ends at a certain frequency.

The inerters 16 and 17 both extend along the common axis B.

The mutually coincident axes B of the inerters 16 and 17 define an axis of longitudinal extension of the device 15.

The screws 20a and 20b of the inerters 16 and 17 rotationally vibrate about the common axis B, the female screws 21a and 21b of the inerters 16 and 17 axially vibrate about the common axis B, and the rollers 22a and 22b of the inerters 16 and 17 rotationally vibrate about their respective axes C and describe a revolutionary movement around common axis B.

In particular, the screws 20a and 20b of the inerters 16 and 17 rotate about the common axis B in opposite directions of rotation from each other, so as to generate inertia torque directed about axis B of equal modulus and opposite direction on the fuselage 3.

The female screws 21a and 21b of the inerters 16 and 17 are connected to each other.

The device 15 also comprises:
a tubular body 32 defining screw 20a of inerter 16;
a tubular body 33 defining screw 20h of inerter 17; and
a body 34 defining female screws 21a and 21b of the inerters 16 and 17.

Each body 32 and 33 comprises, in particular:
a portion 35 on which the associated screw 20a and 20b is created; and
a bell-shaped portion 36 of greater radial size than portion 35;

The body 34 comprises:
two portions 37 defining the respective female screws 21a and 21b and having a greater diameter than portions 35; and
a portion 38 axially interposed between portions 37 along the common axis B and having a smaller diameter than portions 37.

Portions 35 are housed inside portions 37 and radially spaced apart from them so as to radially face the axis B, the screws 20a and 20b of each inerter 16 and 17 with the associated female screws 21a and 21b.

Each inerter 16 and 17 also comprises:
an associated flywheel 40a and 40b integrally rotatable with the associated screw 20a and 20b about the associated axis B;
an associated thrust bearing 41a and 41b radially interposed between portion 36 of the associated body 32 and 33 and the associated lug 30 and 31.

In the case shown, each flywheel 40a and 40b is located at a shoulder defined by portion 36 of the associated body 32 and 33.

The flywheels 40a and 40b rotationally vibrate together with the corresponding screws 20a and 20b; and 21a and 21b about axis B.

The flywheels 40a and 40b of each inerter 16 and 17 are sized so as to achieve a desired value for the moment of inertia, equal to the sum of the moments of inertia of the screws 20a and 20h, the rollers 22a and 22b (for the latter, taking into account that their revolution speed is different from the rotation speed of the flywheels 40a and 40b), the bodies 32 and 33 and the flywheels 40a and 40b. This moment of inertia value determines the inertance of the associated inerter 16 and 17 and tunes the device 15 to a predetermined vibration frequency value of the casing 5 for which it is wished to prevent transmission to the fuselage 3.

The bearings 41a and 41b enable relative rotation of the associated body 32 and 33 with respect to the associated lug 30 and 31 about the corresponding axis B.

The screw 20a and 20b and the female screw 21a and 21b of each inerter have multi-start threads.

The screw 20a and 20b and the female screw 21a and 21b of each inerter 16 and 17 are arranged radially facing each other and radially spaced apart from each other with respect to axis B.

The rollers 22a and 22b of each inerter 16 and 17 are arranged in a position radially interposed between the associated screw 20a and 20b and the female screw 21a and 21b in a direction radial to axis B.

The rollers 22a and 22b of each inerter 16 and 17 extend along their respective axes C and each have an external thread 23 with respect to the respective axis C.

In order to achieve a rotation in mutually opposite directions, the threads of screw 20a and female screw 21a and the threads 23 of rollers 22a of inerter 16 have a first handedness and the threads of screw 20h and female screw 21b and the threads 23 of rollers 22b of inerter 17 have the same first handedness.

The rollers 22a and 22b of each inerter 16 and 17 are integrally movable with the female screw 21a and 21b with translation in a direction parallel to axis B.

Preferably, the thread angle of the thread 23 on the rollers 22a and 22b of each inerter 16 and 17 is equal to the thread angle of the female screw 21a and 21b.

Each roller 22a and 22b also comprises:
two mutually opposite axial ends 27 and 28; and
two cogwheels 45 and 46 placed adjacent to the respective ends 27 and 28.

In the embodiment shown, the threads 23 of the rollers 22a and 22b of each inerter 16 and 17 are single-start threads.

It is important to underline that the angles of the threads 23 of the rollers 22a and 22b, of the screw 20a and 20b and of the female screw 21a and 21b of the inerters 16 and 17 shown in the accompanying figures are purely indicative.

The coupling between the threads 23 of the rollers 22a and 22b and the screw 20a and 20b and the female screw 21a and 21b of the inerters 16 and 17 is reversible.

Each inerter 16 and 17 also comprises two crown wheels 47 and 48, respectively fastened to the female screw 21a and 21b and made in one piece with the female screw 21a and 21b.

The crowns 47 and 48 of each inerter 16 and 17 are coaxial with axis B and spaced out along axis B.

Each crown 47 and 48 has internal gear teeth 49 meshing with the respective cogwheels 45 and 46 of each roller 22a and 22b.

In this way, the cogwheels 45 and 46 of each inerter 16 and 17 mesh with (FIG. 5) the gear teeth 49 during rotation of the rollers 22a, 22b around axis B.

Each inerter 16 and 17 also comprises an associated pair of disc-shaped supports 25 on axis B, spaced apart from each other along the associated axis B and, in the case shown, integral with the associated female screw 21a and 21b.

Each support 25 defines a plurality of seats 26 angularly equi-spaced from each other around axis B and engaged by the axial ends 27 of respective rollers 22a and 22b.

Figure 2:
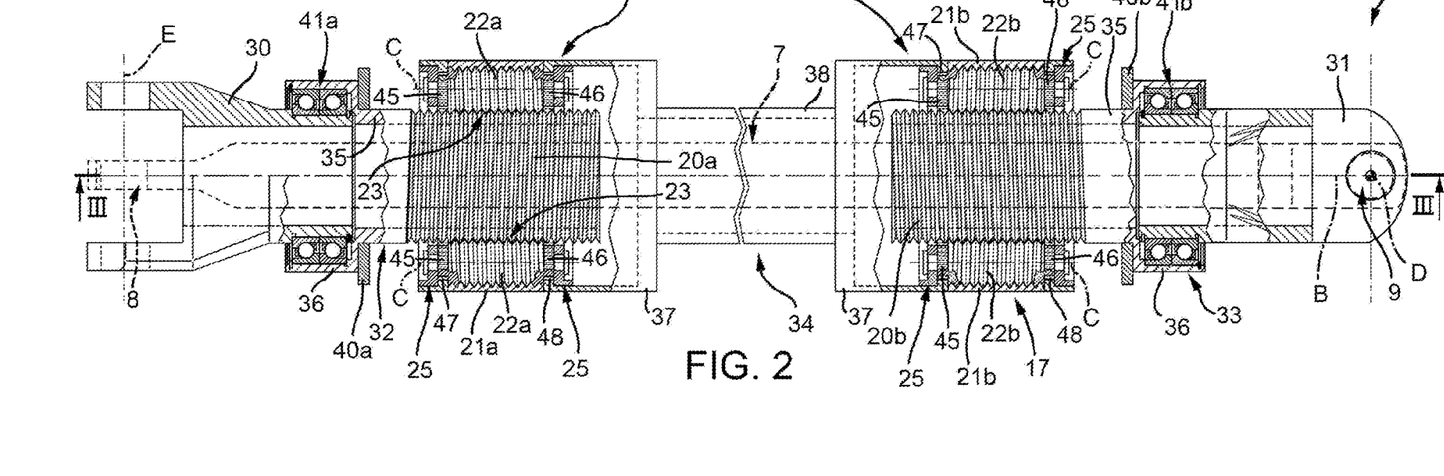
FIG. 2 is a section, on an enlarged scale, along the axis II-II of FIG. 1 of a component of the kit of FIG. 1, with parts removed for the sake of clarity.
Figure 3:
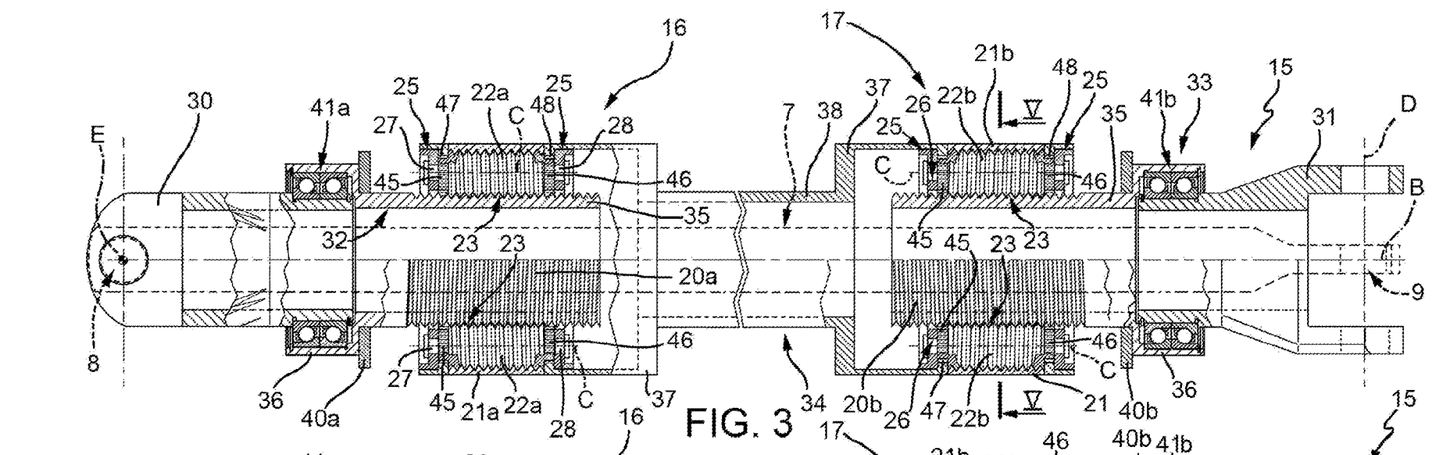
FIG. 3 is a section, on an enlarged scale, along the line of FIG. 2 of the component in FIG. 2, with parts removed for the sake of clarity.
Figure 4:
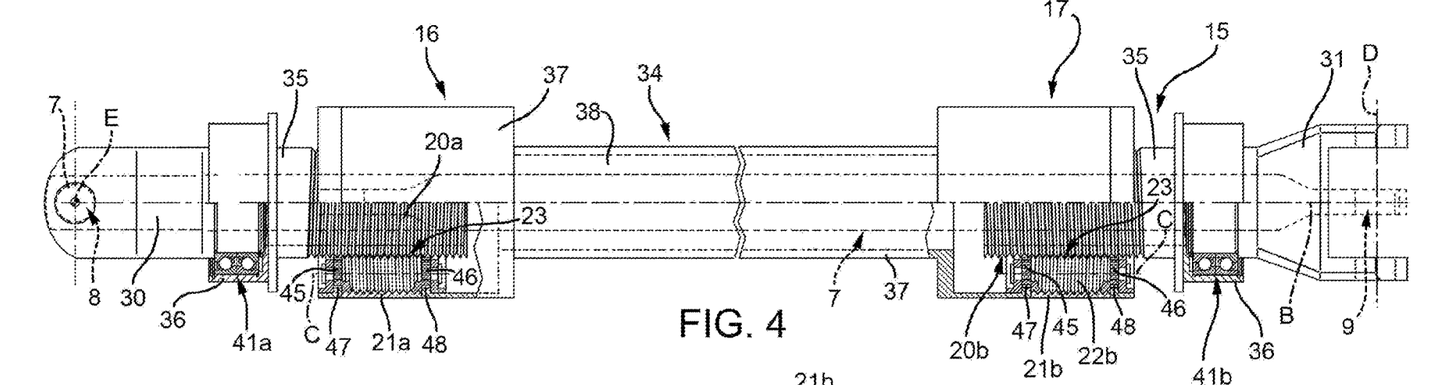
FIG. 4 is a half-section view of the component of FIGS. 2 and 3, with parts removed for the sake of clarity
Figure 5:
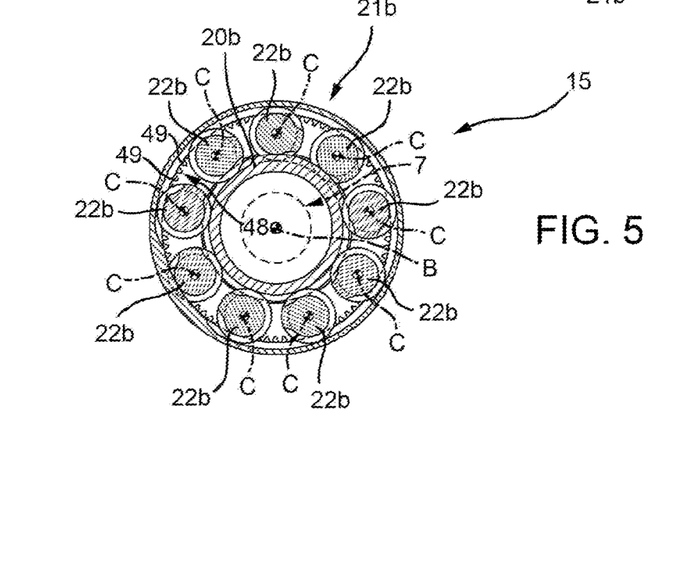
FIG. 5 is a section along line V-V in FIG. 3.

In the embodiment shown, there is radial play between the supports 25 and portion 36 that is not visible in the FIGS. 2 and 3.

In an alternative embodiment, elements made of a low-friction material can be interposed between the supports 25 and the portion 36 defining the female screws 21a and 21b.

The ends 8 and 9 of the rod 7 are housed inside lugs 30 and 31, respectively.

The rod 7 extends, proceeding from end 8 towards end 9 along the common axis B, inside lug 30, the tubular bodies 32, 34 and 33 and lug 31.

In particular, the diameter of the rod 7 is less than the diameter of the screw 20a and 20b.

In use, the mast 6 drives the hub and the blades in rotation about axis A.

The rotation of the hub and the blades generates aerodynamic loads on the blades and consequent vibrations, which are transmitted to the mast 6.

The rods 7 connect the fuselage 3 to the casing 5 of the rotor 4.

The operation of the helicopter 2 is illustrated hereinafter with reference to a single rod 7 and a single device 15.

Operating the rotor 4 causes the generation of vibratory loads.

These vibratory loads are transmitted from the casing 5 of the rotor 4 to lug 30 at anchor 13.

Lug 30 is hinged to anchor 13 about axis E.

Therefore, operation of the rotor 4 causes the generation of axial vibrations on lug 30 directed parallel to axis B.

These axial vibrations cause axes D and E to move towards and further away from each other and the compression/traction of the rod 7.

As a consequence, the female screws 21a and 21b and tubular body 34 vibrate axially, parallel to axis B.

The rollers 22a and 22b of the inerters 16 and 17 also vibrate parallel to axis B integrally with the respective female screws 21a and 21b.

In addition, due to the coupling of their respective threads 23 with the threads of the respective female screws 21a and 21b and screws 20a and 20b, the rollers 22a and 22b:

rotationally vibrate about their respective axes C with respect to the associated screws 20a and 20b and female screws 21a and 21b; and describe a revolutionary movement around axis B with respect to the associated screws 20a and 20b and female screws 21a and 21b.

In particular, the supports 25 rotationally vibrate about axis B integrally with the rollers 22a and 22b, so as to keep the rollers 22a and 22b angularly equi-spaced with respect to axis B.

In addition, during the rotational vibration of the rollers 22a and 22b, the respective cogwheels 45 and 46 mesh with the gear tooth 49 of the crowns 47 and 48, fixed with respect to the female screw 21a and 21b of the inerter 16 and 17.

This enables the rollers 22a and 22b of the respective inerters 16 and 17 to revolve around axis B.

The rotation of the rollers 22a and 22b about the associated axes C causes the rotation of the respective screws 20a and 20b of the inerters 16 and 17 around axes B.

The flywheels 40a and 40b and the respective bodies 32 and 33 of the inerters 16 and 17 rotationally vibrate about axis B.

Due to the presence of the bearings 41a and 41b, the bodies 32 and 33, and therefore the screws 20a and 20b of the inerters 16 and 17, can rotationally vibrate about axis B with respect to lugs 30 and 31.

The device 15 thus generates inertial vibratory forces originating from the vibratory movement transmitted from the casing 5 to lug 30.

More specifically, these inertial vibratory forces are due to the alternating rotatory vibration of the rollers 22a and 22b of bodies 32 and 33, of the screws 20a and 20b and of the flywheels 40a and 40b of the inerters 16 and 17.

Due to the alternating rotation of the rollers 22a, of the screw 20a, bodies 32 and 33 and flywheel 40a of inerter 16, the latter applies equal torque forces to lug 30 and to inerter 17. These equal forces oppose each other and are proportional to the relative acceleration between lug 30 and inerter 17.

In an entirely similar manner, inerter 17 applies equal torque forces to inerter 16 and to lug 31. These equal forces oppose each other and are proportional to the relative acceleration between inerter 16 and lug 31.

The forces exchanged between the inerters 16 and 17 are equal and opposite to each other.

Consequently, the device 15 applies equal torque forces to the lugs 30 and 31, and therefore to the casing 5 of the rotor 4 and the top portion 10 of the fuselage 3.

These torque forces dampen or cancel the vibrations transmitted to the fuselage 3 without generating torque on the fuselage 3, thereby increasing the comfort of the occupants of the helicopter 2.

Figure 6:
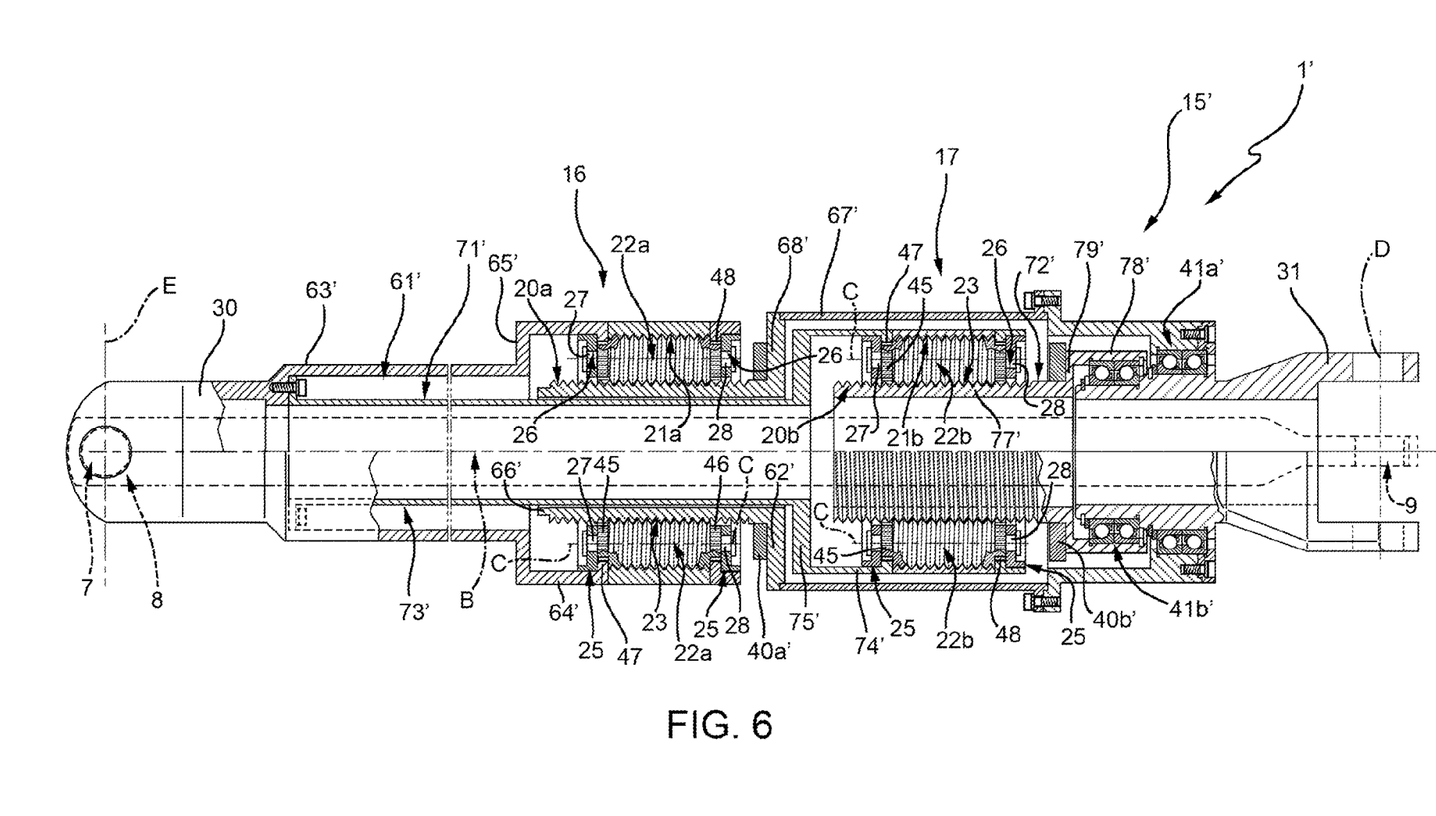
FIG. 6 is a section of a component of a second embodiment of the kit of FIG. 1 with parts removed for the sake of clarity.

Referring to FIG. 6, reference numeral 1' indicates a kit according to a further embodiment of the present invention.

Kit 1' is similar to kit 1 and will be described hereinafter only with regard to its differences from the latter; where possible, the same or corresponding parts of kit 1 and kit 1' will be indicated with the same reference numbers.

In particular, the device 15' of kit 1' differs from the device 15 of kit 1 in that the inerters 16 and 17 are arranged in parallel instead of in series.

In greater detail, device 15' differs from device 15 in that:

the female screws 21a and 21b are both fastened to lug 30; and the screws 20a and 20b are both supported by thrust bearings 41a' and 41b' with respect to lug 31.

In greater detail, device 15' comprises:

a body 61' adapted to vibrate parallel to axis B, defining female screw 21a and fastened to lug 30; and a body 62' rotatable about axis B, defining screw 20a, supported by thrust bearing 41a' with respect to lug 31, and to which flywheel 40a' is fastened.

The body 61', in turn, comprises:

an axial section 63' fastened to lug 30;

an axial section 64', of larger diameter than section 63' and defining the female screw 21b; and a radial shoulder 65', which is axially interposed between sections 63' and 64'.

Body 62', in turn, comprises:

an axial section 66', facing towards the lug 30 and defining the screw 20a;

a section 67' axially supported by the bearing 41a' and having a larger diameter than section 66'; and a radial shoulder 68', axially interposed between sections 66' and 67' and to which the flywheel 40a' is fastened.

In particular, section 66' of body 62' is housed with radial play inside section 64' of body 61'.

The device 15' also comprises:

a body 71' adapted to vibrate parallel to axis B, defining female screw 21b and fastened to lug 30; and a body 72' rotatable about axis B, defining screw 20b, supported by thrust bearing 41b' with respect to lug 31, and to which flywheel 40b' is fastened.

The body 71', in turn, comprises:

an axial section 73' fastened to lug 30;

an axial section 74', of larger diameter than section 73' and defining the female screw 21b; and a radial shoulder 75', which is axially interposed between sections 73' and 74'.

Sections 73' and 74' of body 71' are housed with radial play inside sections 63' and 67' of body 62'.

The body 72', in turn, comprises:

an axial section 77', facing towards lug 30 and defining screw 20b;

an axial section 78', axially supported by thrust bearing 41b' and having a larger diameter than section 77'; and a radial shoulder 79', to which flywheel 40b' is fastened.

The sections 77' and 78' of body 72' are housed with radial play inside section 74' of body 71' and section 67' of body 62', respectively.

In the case shown, the bodies 61', 62', 71' and 72' are bell-shaped.

Finally, device 15' differs from device 15 in that the threads of screw 20a, female screw 21a and rollers 22a of inerter 16 have a first handedness and the threads of screw 20b, female screw 21b and rollers 22b of inerter 17 have a second handedness, opposite to the first handedness.

This enables the rotation to be achieved in mutually different directions of screws 20a and 20b and of rollers 22a and 22b of the inerters 16 and 17.

The functioning of kit 1' differs from the functioning of kit 1 in that the operation of the rotor 4 causes axes D and E to move towards and further away from each other and, as a consequently, the generation of axial vibrations on lug 30 and on the female screws 21a and 21b of the inerters 16 and 17.

In this "in parallel" case, the inerters 16 and 17 are subjected to the same relative displacement, and therefore to the same acceleration as lugs 30 and 31. It follows that the overall inertance of device 15 is double the inertance of the single inerter 16 and 17. The axial vibrations of the female screws 21a and 21b of the inerters 16 and 17 cause the axial vibrations of the rollers 22a and 22b of the inerters 16 and 17.

Furthermore, due to the coupling of the respective threads 23 with the threads of the respective female screw 21a and screw 20a of inerter 16, rollers 22a of inerter 16:

rotationally vibrate about their respective axes C with respect to the associated screws 20a and female screws 21a; and describe a revolutionary movement around axis B with respect to the associated screws 20a and female screws 21a.

In addition, the rotational vibration of rollers 22a of inerter 16 about the associated axes C causes rotational vibration of screw 20a and flywheel 40a of inerter 16 about axis B.

Through the coupling between threads 23 of rollers 22b and the thread of female screw 21b, rollers 22b:

rotationally vibrate about their respective axes C with respect to the associated screws 20b and female screws 21b of inerter 17; and describe a revolutionary movement around axis B with respect to the associated screws 20b and female screws 21b of inerter 17.

The rotational vibration of rollers 22b of inerter 17 causes, due to the coupling between thread 23 and the thread of screw 20b of inerter 17, the rotational vibration of screw 20b of inerter 17 about axis B.

The bearings 41a' and 41b' support the axial thrusts generated parallel to axis B by the respective screws 20a and 20b.

The bearings 41a' and 41b' also allow the rotation of the screws 20a and 20b of the inerters 16 and 17 with respect to lug 31, thereby avoiding the transmission of rotational vibrations to lug 31, and therefore to the fuselage 3.

In a similar way to device 15 of kit 1, device 15' of kit 1' generates inertial vibratory forces due to the rotational vibration of the rollers 22a and 22b, the screws 20a and 20b, female screw 21b and the flywheels 40a and 40b of the inerters 16 and 17.

In an entirely similar manner to device 15 of kit 1, device 15' of kit 1' applies resultant equal torque forces to the lugs 30 and 31, and therefore to the casing 5 of the rotor 4 and to the top portion 10 of the fuselage 3.

These torque forces dampen or cancel the vibrations transmitted to the fuselage 3, thereby increasing the comfort of the occupants of the helicopter 2.

In an entirely similar manner to device 15 of kit 1, device 15' exerts torque on the fuselage 3 about axis B having an essentially zero modulus as the two inerters 16 and 17 discharge inertial reaction torque, ideally of equal modulus, in opposite directions.

From examination of the kit 1 and 1' according to the present invention, the advantages that can be achieved therewith are evident.

In particular, the kit 1 and 1' comprises a plurality of damping devices 15 and 15', each comprising a pair of inerters 16 and 17.

The inerters 16 and 17 transform the vibrations of the casing 5 of the rotor 4 into rotational vibration of the screws 20a and 20b, the rollers 22a and 22b and the flywheels 40a and 40b.

This rotational vibration generates a force acting on the anchors 12 and 13 that is proportional to the relative acceleration of the anchors 12 and 13.

This force curbs the transmission of vibrations to anchor 13, and therefore to the fuselage 3, improving the comfort perceived inside the helicopter 2.

Since the screws 20a and 20b, and therefore also the flywheels 40a and 40b, of the inerters 16 and 17 rotate in opposite directions from each other, the inertia torque transmitted to the fuselage 3 of the helicopter 2 is practically zero.

This allows the comfort of the occupants of the helicopter 2 to be further increased, with obvious advantages for helicopters in the VIP segment.

In particular, due to the "in series" layout, the inerters 16 and 17 of device 15 are subjected to reduced angular accelerations, and are thus subject to less wear of parts, especially the threads of the screws 20 and female screws 21 and the threads 23 of the rollers 22.

Due to their "in parallel" configuration, the inerters 16 and 17 of device 15' exploit the entire inertance of each inerter 16 and 17, thereby allowing the mass of the flywheels 40a' and 40b' to be minimized for the same effectiveness of device 15'.

Furthermore, the inerters 16 and 17 of device 15 have reduced accelerations and the inerters 16 and 17 of device 15' have particularly small dimensions, thereby reducing the risk of damage to the devices 15 and 15'. Each device 15 and 15' houses the rod 7 and is hinged to the associated anchors 12 and 13 about the same hinging axes D and E of the associated rod 7 to the anchors 12 and 13.

In consequence, the devices 15 and 15' do not require any substantial redesign of the helicopter 2 and make use of the anchors 12 and 13 already provided for fixing the rods 7 between the casing 5 and the top portion 10 of the fuselage 3.

Moreover, this makes the kit 1 and 1' retro-fittable in a particularly simple and inexpensive manner on already existing helicopters 2 equipped with rods 7.

To this end, it is sufficient to just hinge the device 15 and 15' to the already existing anchors 12 and 13 about axes D and E.

Finally, it is clear that modifications and variants can be made regarding the kit 1 and 1' described and illustrated herein without departing from the scope defined by the claims.

In particular, the screws 20a and 20b of the devices 15 and 15' could slide with respect to axis B and the female screws 21a and 21b could rotate about axis B.

In this case, with reference to devices 15, the respective female screws 21a and 21b would be supported by the respective bearings 41a and 41b on the associated lugs 30 and 31, and the respective screws 20a and 20b would be connected to each other.

Regarding devices 15', the respective screws 20a and 20b would be fastened to lug 30 and the respective female screws 21a and 21b would be axially supported by lug 31, via the respective bearings 41a' and 41b'.

Furthermore, in addition to revolving around axis B with respect to the screw 20a and 20b, the rollers 22a and 22b of the devices 15 and 15' could also be axially free to translate with respect the female screw 21a and 21b parallel to axis B.

In addition, the devices 15 and 15' could be housed inside the respective rods 7 or connected to further respective structural elements interposed between the top portion 10 of the fuselage 3 and the casing 5.

Finally, the tubular bodies 32 and 33 of each device 15 and 15' could be directly fastened to the associated rod 7.

The invention claimed is:

1. A kit (1, 1') for a helicopter (2), said helicopter (2) comprising a fuselage (3) and a rotor (4);
   said kit (1, 1') comprising at least one device (15) designed to dampen the vibrations transmitted from said rotor (4) to said fuselage (2) and be interposed between said fuselage (2) and said rotor (4);
   characterised in that said device (15, 15'), in turn, comprises:
   a pair of first threaded elements (21a, 21b; 20a, 20b) movable parallel along a first axis (B) and adapted to vibrate parallel to said first axis (B);
   a pair of second threaded elements (20a, 20b; 21a, 21b) rotatable about said first axis (B) and operatively connected to respective said first threaded elements (21a, 21b; 20a, 20b), so as to, in use, rotationally vibrate about said first axis (B);
   a first inerter (16); and
   a second inerter (17);
   said first inerter (16), in turn, comprising:
   a first female screw (21a);
   a first screw (20a) operatively connected to said first female screw (21a); and
   a plurality of first threaded rollers (22a), which are screwed on said first female screw and first screw (21a, 20a); said first rollers (22a) being rotatable about respective second axes (C) parallel to and separate from said first axis (B) with respect to said first female screw and first screw (21a, 20a), and being rotatable about said first axis (B) with respect to said first female screw and first screw (21a, 20a);
   said second inerter (17), in turn, comprising:
   a second female screw (21b);
   a second screw (20b) operatively connected to said second female screw (21b); and
   a plurality of second threaded rollers (22b), which are screwed on said second female screw and second screw (21b, 20b); said second rollers (22b) being rotatable about respective second axes (C) parallel to and separate from said first axis (B) with respect to said second female screw and second screw (21b, 20b), and being rotatable about said first axis (B) with respect to said second female screw and second screw (21b, 20b);
   said first and second female screws (21a, 21b) defining said first threaded elements (21a, 21b; 20a, 20b), and said first and second screws (20b, 20a) defining said second threaded elements (20a, 20b; 21a, 21b); or
   said first and second screws (20b, 20a) defining said first threaded elements (21a, 21b; 20a, 20b) and said first and second female screws (21a, 21b) defining said second threaded elements (20a, 20b; 21a, 21b).

2. The kit according to claim 1, characterised in that said second threaded elements (20a, 20b; 21a, 21b) are configured so as to be rotatable with mutually opposite directions of rotation; and/or
   characterised in that said first axes (B) of said first and second inerters (16, 17) coincide with each other and define an extension axis of said device (15, 15'); and/or
   characterised in that said second rotation axes (C) of said first and second rollers (22a, 22b) coincide with each other.

3. The kit according to claim 1, characterised in that said first threaded elements (21a, 21b) of said first and second inerters (16, 17) are together integrally movable parallel to said first axis (B).

4. The kit according to any one of the preceding claim 1, characterised in that the threads of said first threaded element (21a), of said second threaded element (20a) and of said first rollers (22a) of said first inerter (16) have a first handedness;
   the threads of said first threaded element (21b), of said second threaded element (20b) and of said second rollers (22b) of said second inerter (17) have the same said first handedness.

5. The kit according to claim 1, characterised in that it comprises a first anchoring element (30) connectable in an articulated manner to said rotor (4);
   said first threaded elements (21a, 21b) being constrained to said first anchoring element (30).

6. The kit according claim 1, characterised in that the threads of said first threaded element (21a), of said second threaded element (20a) and of said first rollers (22a) of said first inerter (16) have a first handedness; and the threads of said first threaded element (21b), of said second threaded element (20b) and of said second rollers (22b) of said second inerter (17) have a second handedness, opposite to said first handedness.

7. The kit according to claim 1, characterised in that said first and second inerters (16, 17) have the same inertance.

8. The kit according to claim 7, characterised in that it comprises:
   a first flywheel (40a, 40a') angularly integral with said second threaded element (20a) of said first inerter (16); and/or
   a second flywheel (40b, 40b') angularly integral with said second threaded element (20b) of said second inerter (17).

9. The kit according to claim 1, characterised in that it comprises:
   a first anchoring element (30) connectable in an articulated manner to said rotor (4);
   a first bearing (41a), which supports said second threaded element (20a) of said first inerter (16) in an angularly movable manner about said first axis (B);
   a second anchoring element (31) connectable in an articulated manner to said fuselage (3); and a second bearing (41b), which supports said second threaded element (20b) of said second inerter (17) in an angularly movable manner about said first axis (B).

10. The kit according to claim 9, characterised in that said first inerter (16) is interposed between said first anchoring element (30) and said second inerter (17);

said second inerter (17) being interposed between said first inerter (16) and said second anchoring element (31).

11. The kit according to claim 1, characterised in that it comprises:

a second anchoring element (31) connectable in an articulated manner to said fuselage (3); and two bearings (41a', 41b') interposed between said second anchoring element (31) and respective said second threaded elements (20a, 20b), and configured to support the loads directed along said first axis (B) discharged from said second threaded elements (20a, 20b).

12. The kit according to claim 11, characterised in that it comprises:

a first body (61') fastened to said first support element (30) and defining said first threaded elements (21a) of said first inerter (16);

a second body (62') rotatable about said first axis (B) and defining said second threaded element (20a) of said second inerter (16);

a third body (71') fastened to said first support element (30) and defining said first threaded elements (21b) of said second inerter (17); and a fourth body (72') rotatable about said first axis (B) and defining said second threaded element (20b) of said second inerter (17);

said second body (62') being at least partially housed inside said first body (61');

said third body (71') being at least partially housed inside said second body (62'); and said fourth body (72') being at least partially housed inside said third body (61').

13. A helicopter comprising:

said fuselage (2);

said rotor (4);

a support casing (5) of said rotor (4); and a plurality of connecting rods (7) interposed between said fuselage (2) and said support casing (5);

characterised in that it comprises, for each said rod (7), a kit (1, 1') according claim 1;

said device (15, 15') being interposed between said casing (5) and said fuselage (2).

14. The helicopter according to claim 13 characterised in that said at least one rod (7) and said respective device (15, 15') are hinged to said fuselage (3) about the same respective third axes (D) coincident with each other;

said at least one rod (7) and said respective device (15, 15') being hinged to said rotor (4) about the same respective fourth axes (E) coincident with each other.

15. The helicopter according to claim 13, characterised in that one of said rod (7) and said device (15, 15') is housed inside the other of said rod (7) and said device (15, 15').

* * * * *